US007477600B1

(12) United States Patent
Mor et al.

(10) Patent No.: US 7,477,600 B1
(45) Date of Patent: Jan. 13, 2009

(54) METHOD AND APPARATUS FOR CONFIGURING NETWORK ELEMENTS TO SUPPORT REAL TIME APPLICATIONS BASED ON META-TEMPLATES

(75) Inventors: Yishay Mor, Jerusalem (IL); Dror Koren, Zikhron Ya'aqov (IL)

(73) Assignee: Cisco Technology, Inc., San Jose, CA (US)

( * ) Notice: Subject to any disclaimer, the term of this patent is extended or adjusted under 35 U.S.C. 154(b) by 1447 days.

(21) Appl. No.: 10/341,851

(22) Filed: Jan. 13, 2003

Related U.S. Application Data

(63) Continuation-in-part of application No. 10/210,505, filed on Jul. 31, 2002, now Pat. No. 7,333,432, and a continuation-in-part of application No. 10/076,258, filed on Feb. 12, 2002.

(51) Int. Cl.
H04L 12/28 (2006.01)
(52) U.S. Cl. ...................................... 370/231; 370/235
(58) Field of Classification Search .................. 370/231, 370/235
See application file for complete search history.

(56) References Cited

U.S. PATENT DOCUMENTS

| 5,359,593 | A | 10/1994 | Derby et al. |
|---|---|---|---|
| 5,594,792 | A | 1/1997 | Chouraki et al. |
| 5,928,331 | A | 7/1999 | Bushmitch |
| 5,968,176 | A | 10/1999 | Nessett et al. |
| 5,970,064 | A | 10/1999 | Clark et al. |
| 6,009,081 | A | 12/1999 | Wheeler et al. |
| 6,021,263 | A | 2/2000 | Kujoory et al. |
| 6,021,439 | A | 2/2000 | Turek et al. |
| 6,028,842 | A | 2/2000 | Chapman et al. |

(Continued)

FOREIGN PATENT DOCUMENTS

GB   EP 1351445 A1 * 10/2003

OTHER PUBLICATIONS

R. Braden, et al., "Resource ReSerVation Protocol (RSVP)—Version 1 Functional Specification," Sep. 1997, http://www.ietf.org/rfc/frc2205.txt.?number=2205, printed Sep. 19. 2003, pp. 1-105.

(Continued)

*Primary Examiner*—Edan Orgad
*Assistant Examiner*—Jay P Patel
(74) *Attorney, Agent, or Firm*—Hickman Palermo Truong & Becker LLP

(57) ABSTRACT

Techniques for configuring a network to support real-time applications include maintaining multiple templates and a meta-template. Maintaining each template includes associating a class of network elements with an action to perform on a network data packet by a network element that belongs to the class. The class is defined by a first constraint set on one or more first properties of the network elements. Maintaining the meta-template includes associating external information with an associated template. The external information indicates a second constraint set on one or more second properties different from the one or more first properties. The network elements are automatically configured based at least in part on the meta-template. These techniques allow two members of the same class to be automatically configured for different QoS policies based on such external information as a property of a peer device or data rate on a connected link.

16 Claims, 9 Drawing Sheets

U.S. PATENT DOCUMENTS

| | | | |
|---|---|---|---|
| 6,046,980 | A | 4/2000 | Packer |
| 6,047,322 | A | 4/2000 | Vaid et al. |
| 6,061,725 | A | 5/2000 | Schwaller et al. |
| 6,104,700 | A | 8/2000 | Haddock et al. |
| 6,118,760 | A | 9/2000 | Zaumen et al. |
| 6,154,776 | A | 11/2000 | Martin |
| 6,167,445 | A | 12/2000 | Gai et al. |
| 6,169,748 | B1 | 1/2001 | Barbas et al. |
| 6,170,009 | B1 | 1/2001 | Mandal et al. |
| 6,212,184 | B1 | 4/2001 | Venkatachary et al. |
| 6,286,052 | B1 | 9/2001 | McCloghrie et al. |
| 6,301,253 | B1 | 10/2001 | Ichikawa |
| 6,301,613 | B1 | 10/2001 | Ahlstrom et al. |
| 6,324,184 | B1 | 11/2001 | Hou et al. |
| 6,327,618 | B1 | 12/2001 | Ahlstrom et al. |
| 6,363,429 | B1 | 3/2002 | Ketcham |
| 6,393,473 | B1 | 5/2002 | Chu |
| 6,401,240 | B1 | 6/2002 | Summers |
| 6,424,659 | B2 | 7/2002 | Viswanadham et al. |
| 6,430,154 | B1 | 8/2002 | Hunt et al. |
| 6,442,151 | B1 | 8/2002 | H'mimy et al. |
| 6,463,470 | B1 | 10/2002 | Mohaban et al. |
| 6,466,984 | B1 | 10/2002 | Naveh et al. |
| 6,473,793 | B1 | 10/2002 | Dillion et al. |
| 6,483,805 | B1 | 11/2002 | Davies et al. |
| 6,484,261 | B1 | 11/2002 | Wiegel |
| 6,539,425 | B1 | 3/2003 | Stevens et al. |
| 6,570,875 | B1 | 5/2003 | Hegde |
| 6,577,644 | B1 | 6/2003 | Chuah et al. |
| 6,594,268 | B1 * | 7/2003 | Aukia et al. ............ 370/400 |
| 6,601,082 | B1 | 7/2003 | Durham et al. |
| 6,611,863 | B1 | 8/2003 | Banginwar |
| 6,611,864 | B2 | 8/2003 | Putzolu et al. |
| 6,621,793 | B2 * | 9/2003 | Widegren et al. ........ 370/230.1 |
| 6,622,170 | B1 | 9/2003 | Harrison et al. |
| 6,651,191 | B1 | 11/2003 | Vacante et al. |
| 6,671,724 | B1 | 12/2003 | Pandya et al. |
| 6,684,244 | B1 | 1/2004 | Goldman et al. |
| 6,718,379 | B1 | 4/2004 | Krishna et al. |
| 6,718,380 | B1 | 4/2004 | Mohaban et al. |
| 6,826,147 | B1 | 11/2004 | Nandy et al. |
| 6,839,766 | B1 | 1/2005 | Parnafes et al. |
| 6,959,332 | B1 | 10/2005 | Zavalkovsky et al. |
| 7,072,336 | B2 * | 7/2006 | Barany et al. ............ 370/389 |
| 7,272,155 | B2 * | 9/2007 | Kenney et al. ............ 370/469 |
| 2002/0065907 | A1 | 5/2002 | Cloonan et al. |

OTHER PUBLICATIONS

S. Blake, et al., "An Architecture for Differentiated Services," Dec. 1998, pp. 1-36.

D. Durham, et al., "The COPS (Common Open Policy Service) Protocol," Jan. 2000, pp. 1-38.

S. Herzog, et al., "COPS usage for RSVP," Jan. 2000, pp. 1-17.

* cited by examiner

FIG. 3C

320 WINDOW

398 CONTROL ELEMENTS FOR SELECTING OTHER QOS MANAGEMENT FUNCTIONS

396 DISPLAY FOR IP TELEPHONY CONFIGURATION WINDOWS NAVIGATION

322 EXPLANATORY MATERIAL FOR NEXT ROLE IN IP TELEPHONY (E.G., IP PHONE CONNECTIONS)

326 CONTROL ELEMENTS TO SELECT CORRESPONDING NETWORK ELEMENTS

324 LIST OF IP TELEPHONY CAPABLE NETWORK ELEMENTS FOR ROLE (E.G., INTERFACES FOR IP PHONE CONNECTIONS)

390 CONTROL ELEMENTS FOR IP TELEPHONY CONFIGURATION WINDOWS NAVIGATION

- 391 BACK BUTTON
- 392 NEXT BUTTON
- 393 FINISH BUTTON
- 394 CANCEL BUTTON

FIG. 3D

330 WINDOW

398 CONTROL ELEMENTS FOR SELECTING OTHER QOS MANAGEMENT FUNCTIONS

396 DISPLAY FOR IP TELEPHONY CONFIGURATION WINDOWS NAVIGATION

332 EXPLANATORY MATERIAL FOR NETWORK ELEMENTS ASSIGNED TO ROLE

334 LIST OF POLICY GROUPS FOR ROLE AND NETWORK ELEMENTS ASSOCIATED WITH EACH POLICY GROUP

390 CONTROL ELEMENTS FOR IP TELEPHONY CONFIGURATION WINDOWS NAVIGATION

| 391 BACK BUTTON | 392 NEXT BUTTON | 393 FINISH BUTTON | 394 CANCEL BUTTON |

METHOD AND APPARATUS FOR CONFIGURING NETWORK ELEMENTS TO SUPPORT REAL TIME APPLICATIONS BASED ON META-TEMPLATES

CROSS-REFERENCE TO RELATED APPLICATIONS; PRIORITY CLAIM

This application claims benefit under 35 U.S.C. §120 as a Continuation-in-part of prior application Ser. No. 10/076,258, of Dror Koren and Gil Sheinfeld ("Koren"), filed Feb. 12, 2002, and as a Continuation-in-part of prior application Ser. No. 10/210,505, of Yishay Mor and Dror Koren ("Mor"), filed Jul. 31, 2002 now U.S. Pat. No. 7,333,432, the entire contents of which are hereby incorporated by reference as if fully set forth herein.

FIELD OF THE INVENTION

The present invention relates generally to configuration management of communication networks, and more specifically to techniques for configuration management of network elements to support real-time packet media communication applications.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

In today's high performance internetworks, predictable performance of business-critical applications is needed. Further, real-time applications (e.g., voice, video-conferencing, streaming audio or streaming video), for which minimizing data transmission latency is critical, need to be integrated with bursty data services. As a result, differentiated handling of network traffic is needed.

Quality of Service ("QoS") enables complex networks to control and predictably service a variety of applications. The goal of QoS is to provide consistent, predictable network services for different kinds of network traffic by delivering dedicated bandwidth, controlling jitter and latency, managing congestion and improving traffic flow efficiency. Bandwidth is related to the amount of data that can be transmitted in a unit of time and is often expressed as a number of binary digits (bits) per second. Network latency is a measure of the delay between when a data packet is placed on the network and when it arrives at its destination; jitter refers to variations in network latency.

QoS is a set of capabilities that allow the delivery of differentiated services for network traffic, thereby providing better service for selected network traffic. For example, with QoS, bandwidth of critical traffic can be increased, bandwidth for non-critical traffic can be limited, and consistent network response can be provided. This allows expensive network connections to be used more efficiently, and a network service provider to establish service level agreements with its customers.

QoS typically is implemented in software tools that execute in network devices and management stations. QoS tools generally are separated into three categories: classification, queuing and network provisioning. Classification tools mark a packet or flow with a specific priority. This marking establishes a trust boundary that must be enforced. Queuing tools assign a packet or flow to one of several queues, based on classification, for appropriate treatment in the network. Network provisioning tools accurately calculate the required bandwidth needed for voice conversations, all data traffic, any video applications and necessary link management overhead such as routing protocols, and configure network elements with appropriate QoS parameters.

For effective quality of service treatment, policies must be applied by all intermediate network elements in a path from sender to receiver for a particular message flow. A network element is a component of a network, including a device (such as a router, switch, or hub), a network interface (which may or may not map to a physical port) on such a device, and a virtual local area network (VLAN) which is a group of devices that are involved with passing data packets tagged with a VLAN identifier.

A QoS policy is a conditional statement that includes a set of conditions ("filters") on a data packet and a set of one or more QoS actions to perform on data packets passing into or out of a network element if the data packet satisfies the set of conditions. QoS actions include packet coloring, traffic shaping, priority queuing, custom queuing, limiting, and fragmentation, among other actions known in the art. Coloring assigns a relative importance to a packet. Shaping smoothes the rate of flow of outbound data packets by temporarily saving some packets in buffers until those packets can be transmitted within the specified rate. Queuing assigns outbound data packets to different queues that are given different precedence in the face of network congestion. Limiting limits the bandwidth available for outbound data packets. Fragmentation breaks a large data packet into several smaller data packets so that latency-critical data packets can be interleaved among the smaller fragments without waiting for the large data packet to be transmitted in its entirety.

Accordingly, various QoS management systems are now available. Certain leading systems of this type enable a user or administrator to create and store abstract QoS policies in terms of collections of rules and policy objects. An example of such a system is QoS Policy Manager, commercially available from Cisco Systems, Inc.

QoS tools are important in the management of internet protocol ("IP") networks for real-time applications. Real-time applications, such as voice applications like IP telephony (IPT), have different characteristics and requirements from those of other data applications. Real-time applications tolerate minimal delay and jitter affecting delivery of data packets by network elements. Voice traffic is also intolerant of lost packets (which causes voice clipping and skips) and unreasonably delayed packets (which can cause either voice quality degradation due to end-to-end voice latency or packet loss if delay is variable). Packet loss, delay and jitter all contribute to degraded voice quality. QoS tools available for use in networks are mechanisms to increase data quality on data networks for real-time applications by configuring network elements to result in decreasing dropped data packets for the real-time applications during times of network congestion and by minimizing both the delay and the jitter encountered in a given connection for real-time applications.

In past approaches, configuring QoS for real-time applications on an enterprise network has been difficult. The user has needed to know what interfaces to configure, what QoS policy to apply on each interface, and which QoS tools to use on each interface to implement each policy. The user has needed to enable QoS not just on a few wide-area network (WAN) links, but rather throughout the enterprise, including local-area networks (LANs). The QoS tools that have been available have varied with different devices, device models, and device operating system versions. After selecting the QoS tools, the user has needed to translate the configuration recommendations provided by the QoS tools into the command line interface ("CLI") commands understood by each device.

In the past, many of these tasks have been done manually for a particular device. Design guides, such as the Architecture for Voice, Video and Integrated Data (AVVID) QoS Design Guide, commercially available from Cisco Systems, Inc., provide answers as to what QoS to use and where, in order to manually configure QoS across a network. However, the user still needs to use the telnet protocol to send messages to each and every device and set the recommended commands. This is tedious, time-consuming and prone to human error, for example, from typographical errors inadvertently included in the configuration commands.

Based on the foregoing, there is a clear need for a method which will make the process of configuring QoS for voice or other real-time applications easier, such that the user does not need to do all the work in defining all the network elements to configure for real-time applications, to know what policy to implement at each network element, to know what QoS tools to use to establish each policy at each network element, and to translate each QoS tools into CLI commands.

Further, there is a specific need for a method that will enable new and expert users of packet voice networks to configure the QoS in their network for handling packet voice traffic in a rapid manner, without involving such users in arcane details underlying QoS techniques and implementations.

In some implementations, QoS policies are associated with a class of network elements, which is defined based on intrinsic properties of the network elements, and the positions within a network of the network elements. However, in some networks, the same class of network elements should apply different QoS policies, depending on properties of the network external to the network elements and the network elements' position within the network. For example, the QoS policies applied might differ based on the data rate on a link connected to the network element. In some approaches, the network administrator manually modifies the QoS policies for such network elements based on such external properties.

Thus, there is a specific need for automatic techniques that distinguish the QoS policies applied by network elements based on factors other than intrinsic properties of those network elements.

BRIEF DESCRIPTION OF THE DRAWINGS

The present invention is illustrated by way of example, and not by way of limitation, in the figures of the accompanying drawings and in which like reference numerals refer to similar elements and in which:

FIG. 3C is a block diagram of a window of a user interface for configuring network elements to support IP telephony by selecting elements that perform a particular role, according to an embodiment;

FIG. 3D is a block diagram of a window of a user interface for configuring network elements to support IP telephony by presenting elements associated with each policy group for a particular role, according to an embodiment.

DETAILED DESCRIPTION OF THE PREFERRED EMBODIMENT

Figure 1A:
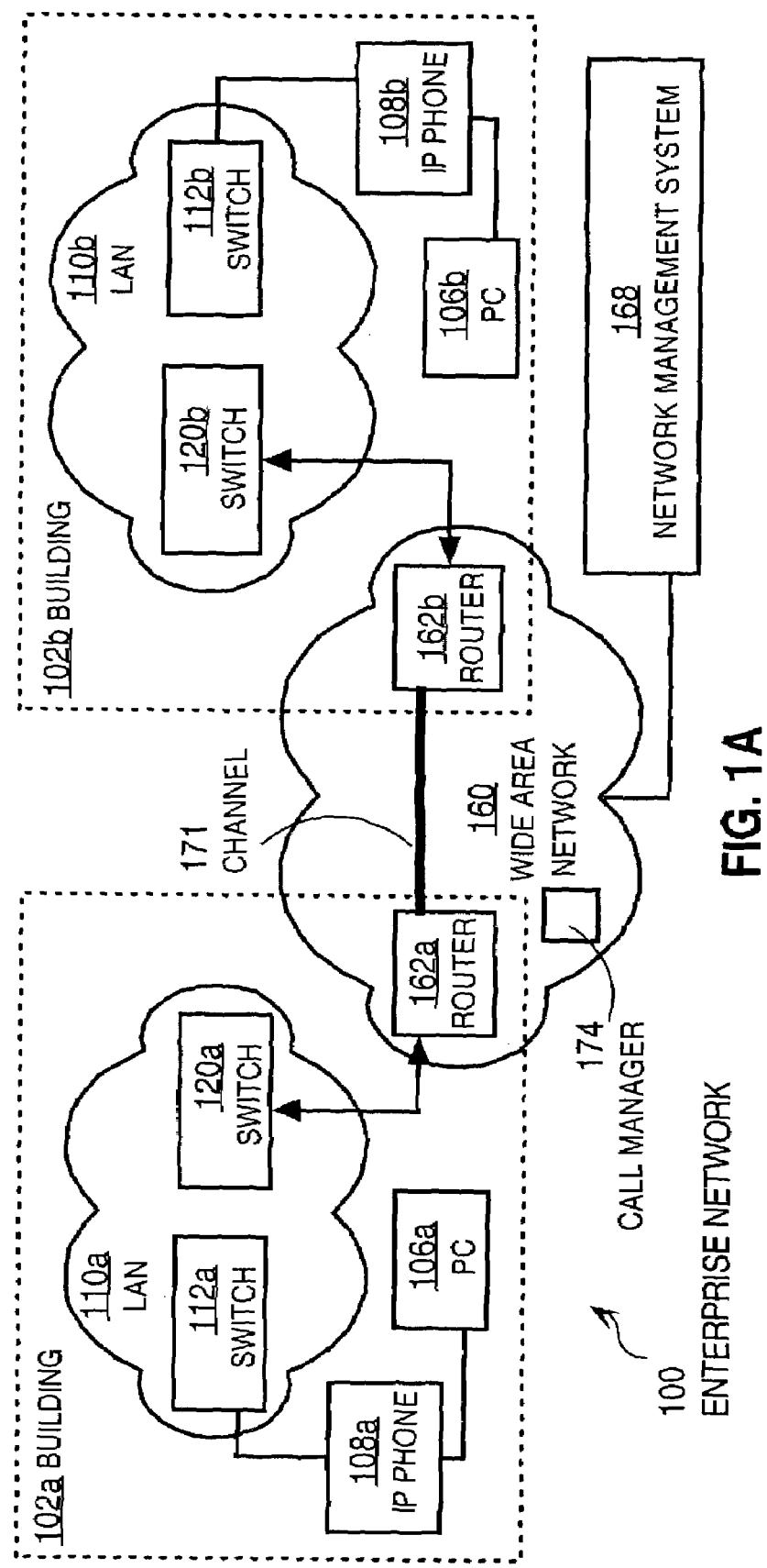
FIG. 1A is a block diagram that illustrates an overview of a network that supports IP telephony.

A method and apparatus for configuring network elements to support real-time applications are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:
   1.0 General Overview
   2.0 Structural and Functional Overview
      2.1 Structural Overview
      2.2 Functional Overview
      2.3 Example Roles
      2.4 Meta-templates
   3.0 Method for Configuring Network Elements
      3.1 Using Roles
      3.2 Using Meta-templates
   4.0 Example of Configuring Network Elements for IP Telephony
      4.1 Example Policy Groups
      4.2 Example Distribution of Policy Groups
   5.0 Implementation Mechanisms—Hardware Overview
   6.0 Extensions and Alternatives 1.0 GENERAL OVERVIEW The needs identified in the foregoing Background, and other needs and objects that will become apparent for the following description, are achieved in the present invention, which comprises, in one aspect, a method for configuring network elements to support real-time applications. The method includes maintaining multiple templates. Maintaining each template involves associating a class of network elements with an action to perform on a network data packet by a network element that belongs to the class. The class of network elements is defined by a first constraint set on one or more first properties of the network elements. The method also involves maintaining a meta-template, which includes associating external information with an associated template. The external information indicates a second constraint set on one or more second properties different from the first properties. The network elements are automatically configuring based, at least in part, on the meta-template.

According to another aspect of the invention, a method includes selecting a particular network element connected to a particular link and selecting a particular meta-template for the particular network element based on the particular link and external information included in the particular meta-template. A particular template is selected based on the particular network element and the particular meta-template. The particular network element is automatically configured based on the particular template. Each template associates a class of network elements with an action to perform on a network data packet by a network element that belongs to the class. The class of network elements is defined by a first constraint set on one or more first properties of the network elements. The meta-template associates the external information with an associated template. The external information indicates a second constraint set on one or more second properties different from the first properties.

In other aspects, the invention encompasses a computer apparatus and a computer readable medium, including a carrier wave, configured to carry out the foregoing steps.

Embodiments of these techniques allow automatically configuring two members of the same class of network elements to apply two different QoS policies based on external information. Examples of such external information include the data rate on a link connected to the network element or a model number of a different network element connected to the particular element by the particular link.

Embodiments of the invention may be used with any real-time application. For purposes of illustrating a specific example, example embodiments are described herein in the context of packet-switched voice networks based on Internet Protocol (IP) and that support IP telephony. However, this specific context is not required, and other real-time applications using other protocols may be substituted.

2.0 STRUCTURAL AND FUNCTIONAL OVERVIEW

2.1 Structural Overview

FIG. 1A is a block diagram that illustrates an overview of an example enterprise network 100 that supports IP telephony. For purposes of illustrating a simple example, FIG. 1A shows a limited number of network elements; however, in a practical embodiment there may be any number of network elements in many different configurations.

In the example of FIG. 1A, two buildings 102a, 102b with local area networks (LANs) 110a, 110b, respectively, are connected by a wide area network (WAN) 160. Each network includes multiple network devices, each having one or more interfaces. For example, LAN 110a includes switches 112a, 120a, among others, and LAN 110b includes switches 112b, 120b, among others, and each switch has multiple interfaces. WAN 160 includes routers 162a, 162b, among others, each with multiple interfaces. Data packets are transported over the WAN using the Internet Protocol (IP). Certain links among networking devices in the WAN may be devoted to traffic between two particular routers such as routers 162a, 162b; such devoted links constitute a channel, such as channel 171, with a designated channel identifier. Examples of channels include a virtual circuit (VC) of an Asynchronous Transfer Mode (ATM) network or a frame relay (FR) network.

To reduce consumption of bandwidth on the LANs 110a, 110b, either LAN, or both LANs, may be divided into two or more virtual local area networks (VLANs). The interfaces, devices and VLANs of enterprise network 100 are configured by a network administrator using network management system 168, which is coupled to the wide area network 160. In other embodiments, the network management system 168 may be connected to a LAN such as LAN 110a or LAN 110b. A network management system includes a computer system; a network management process based on stored instructions, and network management data. The network management system communicates with network management servers on each network device to configure the interfaces on that device.

To support real-time applications, a real time application program running on a computer, such as personal computers (PCs) 106a, 106b, or a special-purpose real time application device, such as IP telephones ("IP phones") 108a, 108b, or both, are connected to a LAN, such as LANs 110a, 110b. A "real-time application device" is used herein to refer to either a computer running a real-time application program, or a special-purpose real time application device. Latency-critical data is sent between a real-time application device transmitter and a real time application device receiver. An IP phone is both a real-time application device transmitter and a real-time application device receiver.

To control the transmission of phone conversations over a packet network, a call manager process ("call manager") 174 runs on at least one device on the network. Although shown in FIG. 1A as within the WAN 160, in other embodiments, the call manager 174 may execute on a computer connected to the WAN or to a LAN, such as LAN 110a or LAN 110b. Cisco Call Manager is a commercial example of call manager 174.

2.2 Functional Overview

A network management system is used to configure the network elements of a network, including interfaces, devices, and VLANs, with QoS attributes to support real-time applications. For example, network management system 168 is used to configure the network elements of the enterprise network 100 with QoS attributes to support IP telephony. According to embodiments of the present invention, the network management system facilitates a network administrator's task by automatically determining different roles performed by different network elements in supporting the real-time application and by automatically associating with each network element, according to its role, one or more policies for acting on data packets passing into or out of that network element. These automatic actions rescue a human administrator from the complex, tedious, and error prone task of individually selecting one or more policies to apply to each network element in an enterprise network.

According to the application of Koren, an administrator uses the database management system to define and store QoS policy groups. A QoS policy template is similar to a policy group except that a template may not have network elements associated with it. In general, a user chooses a template and derives a policy group from it, which will retain the template's structure, and then assigns network elements to the group and deploy it.

The following additional terminology applies to this disclosure. A property is an unconditional statement defining a configuration action to be taken on a network element. A constraint is a statement that defines a limited set of network elements by common properties, such as model, OS version, etc. A policy group is a collection of constraints, policies, properties and network elements, such that the constraints are consistent; all policies and properties can be implemented on any element matching any one of the constraints; and all network elements match at least one of the constraints. A template is a policy group minus the network elements. Policy groups can be associated to the template, so they inherit the constraints, policies and properties from it. Network elements can then be assigned to these policy groups. A role is a collection of policy groups and/or templates that implement the same logical functionality on elements of contradicting properties.

Figure 1B:
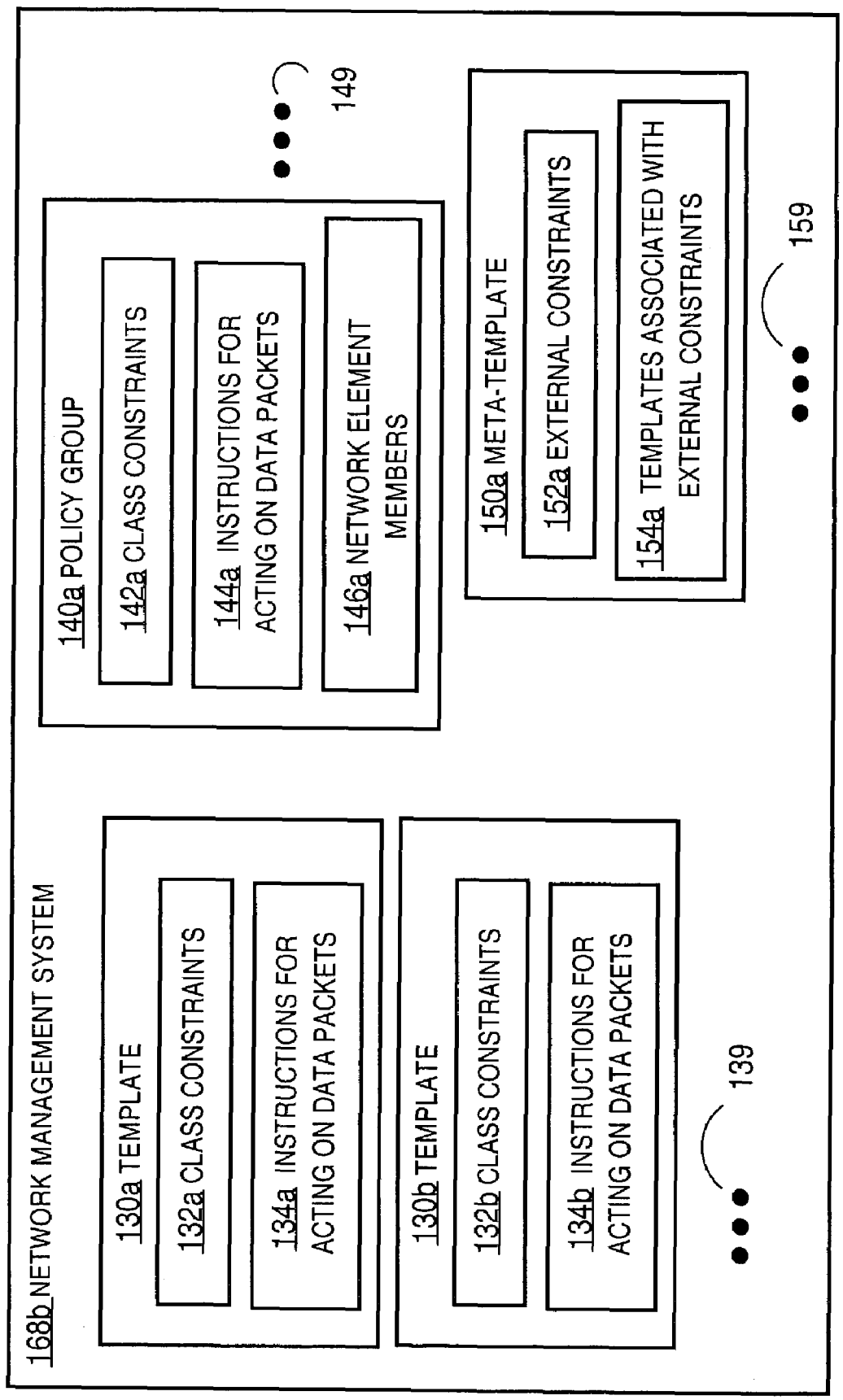
FIG. 1B is a block diagram that illustrates policy groups, templates for policy groups, and meta-templates for policy groups, according to an embodiment.

FIG. 1B is a block diagram that illustrates policy groups, templates for policy groups, and meta-templates for policy groups, according to an embodiment 168b of network management system 168. The illustrated embodiment includes templates 130a, 130b and additional templates, represented by ellipsis 139, collectively referenced hereinafter as templates 130. The illustrated embodiment also includes policy group 140a and additional policy groups represented by ellipsis 149, collectively referenced hereinafter as policy groups 140. The illustrated embodiment also includes meta-template 150a and additional meta-templates represented by ellipsis 159, collectively referenced hereinafter as meta-templates 150. Policy groups 140 are derived from templates 130 and meta-templates 150, as described in more detail below.

As depicted in FIG. 1B, templates 130 include class constraints 132a, 132b among others (collectively reference hereinafter as class constraints 132) that define a class of network elements based on intrinsic properties of those elements. For example, a class of network elements is defined by constraints on the network element interface type, card type, model number and operating system version.

Each QoS policy template includes QoS tools that configure a class of network elements to perform certain QoS actions on data packet flow ("traffic") through the network element. In some embodiments, the template includes data used to translate QoS tools into CLI commands that can be sent via telnet to individual devices or physical ports (interfaces). In the illustrated embodiment, templates 130 include instructions for acting on data packets, such as instructions 134a, 134b, collectively referenced hereinafter as instructions 134. These instructions 134 include the QoS tools and data used to configure a class of network elements to perform certain QoS actions on data packets. As can be seen in FIG. 1B, templates 130 associate constraints 132 that define a class with instructions 134 to configure members of that class to perform QoS actions on data packets.

A policy group 140 is formed from a template 130 by associating one or more actual network elements of a network, which satisfy the class constraints 132, with the instructions 134 that configure the network element to act on data packets. In the illustrated embodiment, the policy group 140a includes the class constraints 142a from the template and the instructions 144a from the template along with a list 146a of one or more network elements of the actual network that are members of the policy group. For example, if policy group 140a is derived from template 130b, then class constraints 142a are based on the class constraints 132b of the template 130b and the instructions 144a are based on the instructions 134b of template 130b. In some embodiments, the class constraints 142 and 144 are not explicitly included in a particular policy group 140, but are included by reference to a particular template 130 upon which the particular policy group 140 is based.

The administrator can then simultaneously deploy the same policy group to multiple network elements of the class. This reduces the task of repeating the same QoS tools and translating them into the same CLI commands at each of the network elements that belong to the class.

It would be useful to have a method for performing the still-tedious task of determining, among hundreds of network elements, a list of network elements to which a particular group is actually deployed. Koren discloses a network management system that, given a particular policy group, displays all the network devices that match the class of that particular policy group, and therefore displays all the devices that can be added to the list of members of the policy group and that can implement the policy included in the policy group. Koren proposes a distribution manager but does not disclose its methods. A distribution manager that identifies the network elements that should implement each group of policies is provided in the Mor application.

For example, functions provided by network elements to completely support a real-time application are divided among multiple roles. The role that a network element performs depends on the network element's position within the network and the device or devices to which the network element is linked, e.g., directly connected. For example, a network element linked to a real-time application device, such as an IP phone, or a streaming audio source or a streaming video source, performs a different role than the same type of element connected only to other devices in a LAN. Associating network elements with roles helps to determine which group of policies should be deployed to that network element.

In some implementations, roles and class constraints are not sufficient to distinguish which policy group to deploy to a particular network element. For example, two switches in the same class that are connected to routers on the WAN might perform the same role, yet other properties of the network, extrinsic to the properties of the switches, render it desirable to configure the switches differently by deploying different policy groups to the two switches. For example, it is assumed, for purposes of illustration, that one router is an older model with a limited amount of memory that supports only marginal voice quality, while the other router has more memory that supports higher quality voice traffic. The QoS policies to be deployed at the two switches should be different. For example, a policy group derived from template 130a should be deployed to a first switch connected to the older model router, and the policy group 140a derived from template 130b should be deployed to a second switch of the same class connected to the newer model router. Determining which QoS policy to implement on each switch is based on differences in the properties of the network external to the switches, not based on differences between the two switches or the roles that the two switches play. Therefore, according to some embodiments, meta-templates are used to select a template based on external information not intrinsic to the network element that implements the policy or its role. In some embodiments the definition of the role is provided by the meta-templates.

As depicted in FIG. 1B, a meta-template 150a associates external constraints, such as external constraint 152a, with a list 154a of associated templates. Meta-template 150a may have a one-to-one mapping to a single template, in which case a single template is used instead of list 154a. Other meta-templates, represented by ellipsis 159, include other external constraints (collectively referenced hereinafter as external constraints 152), with other lists of associated templates (collectively referenced hereinafter as lists of associated templates 154). For example, in meta-template 150a, template 130b included by reference in list 154a is associated with an external constraint 152a that indicates that the model number of the connected router (also called herein a "peer device") include a newer model of the router.

The associations depicted in FIG. 1B may be implemented in any manner known in the art. For example, any template, meta-template, or policy group may be stored in a separate file or data structure, or as separate rows in one or more relational database tables, or as one or more linked lists in a single file.

2.3 Example Roles

Referring to FIG. 1A, a variety of example roles can be illustrated. One interface of Switch 112a is linked to a real-time application device, IP phone 108a, while one or more other interfaces of switch 112a are linked to other network devices within LAN 110a. The interface linked to IP phone 108a performs a different role, called herein an IP Phone role, than does an interface connected to other network elements within the LAN, called herein an IntraLAN role.

Table 1 describes several example roles illustrated by FIG. 1A among other roles. As clear from these descriptions, a variety of example roles are listed in Table 1 or illustrated in FIG. 1A. However, in other embodiments, other roles for network elements may be defined for IP telephony or for other real-time applications.

TABLE 1

Example roles for network elements in IP Telephony.

| Role number | Role Name | Role Description | Example Network Element(s) in FIG. 1A |
|---|---|---|---|
| 1 | IP Phone | interface linked to IP Phone | Switch 112a interface connected to IP phone 108a; Switch 112b interface connected to IP phone 108b; |
| 2 | Soft phone | interface linked to computer with voice software | not shown |
| 3 | Call Manager | interface linked to call manager host | located in WAN 160 and connected to one of the switches |
| 4 | IntraLAN | interface linked to another LAN network element | Switch 112a, 120a interfaces linked to devices in LAN 110a; Switch 112b, 120b interfaces linked to devices in LAN 110b; |
| 5 | VoiceVLAN | interface linked to device on VLAN configured for voice | Switches 112a, 120a if they composed a voice VLAN. |
| 6 | Switch to WAN Router | a switch interface linked to a WAN router | Switch 120a interface linked to Router 162a; Switch 120b interface linked to Router 162b. |
| 7 | WAN Router to Switch | a WAN router interface linked to a switch | Router 162a interface linked to Switch 120a; Router 162b interface linked to Switch 120b; |
| 8 | WAN Point-to-Point | a WAN router interface linked to a point-to-point channel | Routers 162a, 162b interfaces to channel 171 |
| 9 | WAN Frame Relay | a WAN router interface linked to a frame relay channel | If channel 171 is a frame relay channel, routers 162a, 162b interfaces to channel |

One or more policy group templates are defined for each role for each class of network elements that can perform the role. A meta-template for each role distinguishes among the multiple policy group templates for each class based on external information not related to the properties of the network element that belongs to the class. In embodiments with separately defined roles, the meta-templates distinguish among policy groups based on information extrinsic to the definition of the roles. In this context, having "separately defined roles" means that roles are defined in a data structure other than the meta-template, and the meta-template holds constraints on aspects of the network that are not already included in the role definition.

In one embodiment, a distribution manager process ("distribution manager") performs an analysis of network connections and determines the network elements that are connected in such a way as to perform each role, subject to user confirmation. A policy group is then automatically assigned to each network element based on the role the network element performs and the class to which the network element belongs and the external information associated with the policy group template in the meta-template. Alternatively, the foregoing functions are performed by the wizard as defined herein.

2.4 Meta-Templates

One or more meta-templates are defined for each role. In some embodiments, the meta-templates also define the roles. In embodiments without roles, the meta-templates may be used instead of roles. Each meta-template 150 associates a list 154 of references to one or more policy templates with external information about the network. In the illustrated embodiment, the external information includes one or more external constraints 152 on the properties of links or peer devices connected to a network element. A peer device for an individual network element is a second device connected to the individual network element by a link. For example, the external information includes a constraint on the data rate of a link or a constraint on the model number of a peer device. Another example of an external constraint is the name of the element.

3.0 METHOD FOR CONFIGURING NETWORK ELEMENTS

Figure 2A:
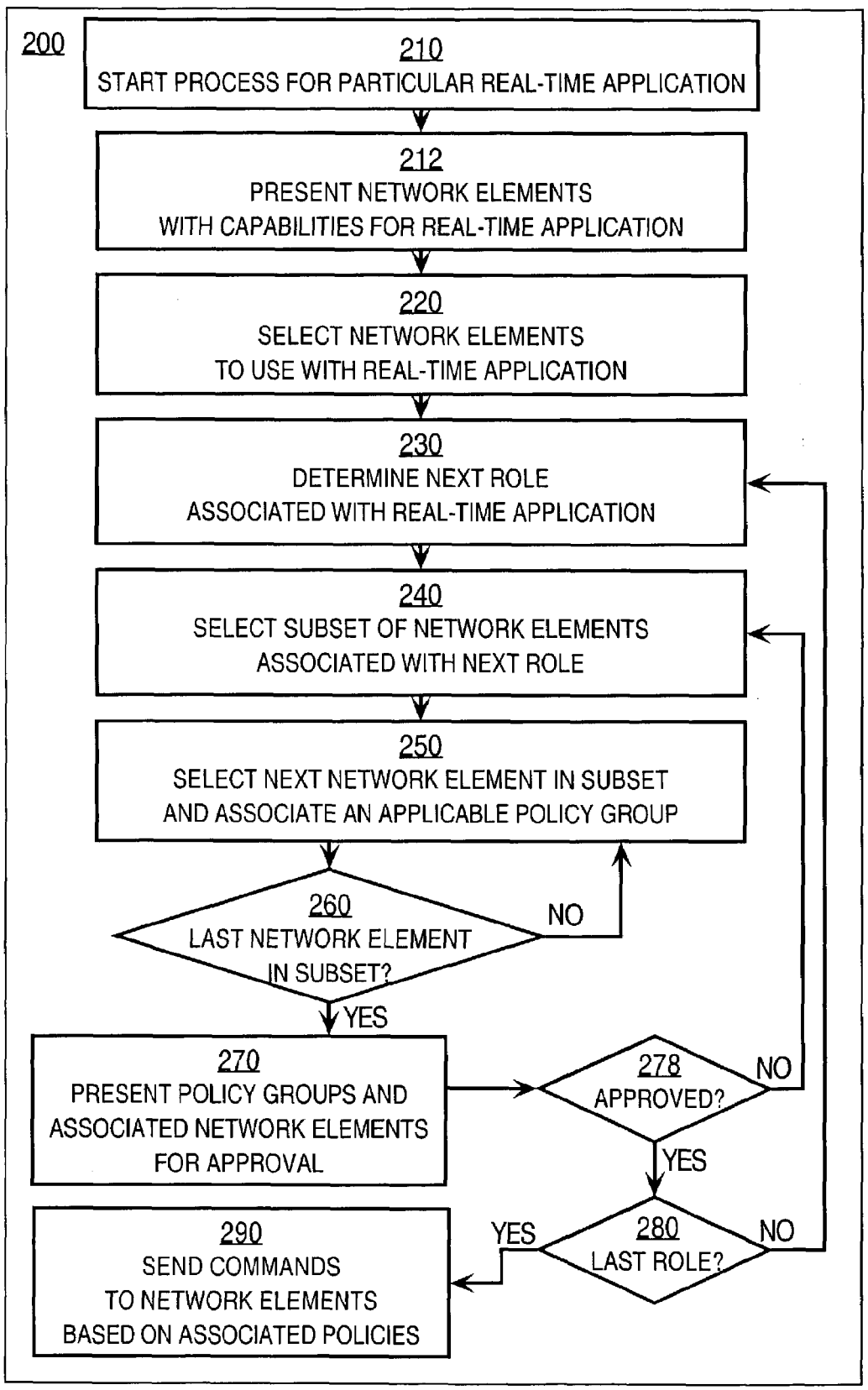
FIG. 2A is a flow diagram that illustrates a high level overview of one embodiment of a method for generating configurations for network elements to support real-time applications, according to an embodiment.

FIG. 2A is a flow diagram that illustrates a high level overview of an example embodiment of a method 200 for configuring network elements to support real-time applications. For purposes of illustration, assume that a distribution manager in the network management system 168 shown in FIG. 1A performs the steps of method 200. Although steps are shown in FIG. 2A, and subsequent flow diagrams, in a particular order, in other embodiments, the steps may be performed in a different order or overlapping in time.

3.1 Using Roles

In step 210, a process is launched for a particular real-time application. In one embodiment, the process provides a configuration "wizard." In this context, a wizard is a process that presents a sequence of graphical user interface pages that prompt the user for input to accomplish a particular task and then accomplishes that task based on those inputs. Example user interface pages are described in more detail in a later section with reference to FIGS. 3A, 3B, 3C, 3D.

Step 210 includes any steps involved in authenticating the user as a network administrator authorized to configure the network for the real-time application. In some embodiments, a different wizard is launched for each different real-time application. In other embodiments, one wizard is launched to configure a network for any of several real-time applications; in this case, step 210 includes receiving input from the network administrator indicating the particular real-time application to be supported. For example, the network administrator indicates that the network is to be configured for IP telephony. Although input from a system administrator is often desirable, it is not necessary; and, in some embodiments, the process is completely automated and does not require such input.

Step 210 also may include receiving input from the network administrator indicating the network domain is to be configured for IP telephony. For example, if the enterprise network 100 depicted in FIG. 1A includes a third LAN in a third building, but the third LAN is not involved in IP telephony, then step 210 includes input indicating that the network domain for IP telephony includes only the two LANs 110a, 110b and the WAN 160. In completely automated embodiments, the entire network administered by the network management system is considered the domain to be configured.

In step 212 the wizard presents to the user a list of all the network devices in the domain that are capable of supporting the real-time application. All other network elements residing on the network devices are selected automatically. In completely automated embodiments, step 212 may be omitted.

In step 220 the network elements for configuration are selected from the list of all the network elements in the selected network domain that can support the real-time application. In some embodiments, step 220 includes receiving input from the network administrator for deleting one or more network elements from the list presented in step 212, or adding one or more planned network elements to the list presented in step 212. In some embodiments, network elements are selected automatically from the list. For example, all LAN network elements capable of supporting the real-time application in LANs 110a, 110b are automatically selected, but only WAN network elements capable of IP telephony along one channel connecting the two LANs are automatically selected.

In step 230 the next role is determined from a set of roles defined for the real-time application. Functions performed by a single network element within a network to support a particular real-time application are assigned to one role of the set of roles. A set of one or more QoS policy group templates describes the actions by a network element to perform each role. A policy group template is a set of one or more policies that may be applied to any network element in a class of network elements and data that indicates the translations to CLI commands to implement the policies.

Any of several models of switches with any of several versions of an operating system may be able to perform a role. For example, the IP Phone role may be performed by an interface on a Catalyst 3550 device available from Cisco Systems Inc., and also by an interface on a Catalyst 6000 device. However, the QoS tools and CLI commands employed to support this role may be different for the different models and operating systems, thus involving different policy groups. Therefore several policy groups are associated with each role, one group for each class of network elements.

Further, one class of network elements may perform different roles. For example, a particular Ethernet interface on the Catalyst 6000 family devices may perform the IP Phone role if linked to an IP phone, or may perform an IntraLAN role if connected to another device on the LAN. A different set of policies may be associated with each different role performed by the same class of network elements. Thus, several policy group templates are associated with each network element class, one for each role the network element class might perform.

Furthermore, a different set of policies may be associated within one role for one class depending upon characteristics of the network independent of the role or the class, such as data rate on a link and properties of peer devices. Thus, several policy group templates are associated with each network element class in each role. To distinguish among these policy templates, a meta-template associates the external characteristics with a template for each class.

Referring again to FIG. 2A, in step 230 the next role associated with the real-time application is determined. For example, one of the roles in Table 1, such as the IP Phone role, is determined to be the next role for IP telephony.

In step 240, a subset of the network elements is selected for the role determined in step 230. The selection may be performed by a user, or a recommended subset of elements may be selected and presented to the user for confirmation. Initially, the subset is selected for the role based on network connections. For example, initially only network elements connected to an IP phone are included in the subset. For example, one interface on each of switches 112a, 112b initially is included in the subset for the IP Phone role, but no interfaces on switches 120a, 120b initially are included. Any rules for automatically including network elements in a subset for a particular role may be employed for the initial members of the subset. Additional example rules, some involving attributes of the devices themselves, are described for an example involving IP telephony in a later section. As an alternative to the example of selection based on network connections, other heuristics may be used to narrow the selection, such as a pattern found in the network element's name. As another alternative, the user might use any knowledge of the network design to determine a selection.

In some embodiments, the network administrator is allowed to modify the list of network elements performing the role during step 240. For example, the network administrator may contemplate moving an IP phone from one location on the LAN to a different location, so that an interface initially included in the subset is removed from the subset and an interface initially excluded is added. In completely automated embodiments, the initially selected subset is also the finally selected subset for the role; the same effect may be achieved by re-running the automatic process.

Steps 250-260 represent a loop through all the network elements in the subset. In step 250, the next network element in the subset is selected and associated with an applicable policy group. An applicable policy group is one that is associated with a class that includes the next network element. The policy group associated with a particular network element, from among the possibly several policy groups applicable for the network element, is the one associated with the role that was determined to be the next role in step 230. In this way, a single policy group is selected for a particular network element even though multiple policy groups may be applicable to the class that includes the particular network element. In some embodiments, a meta-template is used to distinguish among several policy groups applicable to a single combination of class and role. More details about step 250 are presented in a later section with reference to FIG. 2B for an embodiment with meta-templates.

In step 260, a test is performed to determine whether the last network element in the subset has just been associated with an applicable policy group. If so, then control passes to step 270. If not, then control returns to step 250 to select the next network element.

In step 270, the policy groups associated with network elements in the subset are presented to the network administrator for approval. Any presentation method and approval indication may be used. Presentation and approval in an example embodiment using a graphical user interface are described in more detail in a later section. In completely automated embodiments, step 270 may be omitted.

Step 278 represents a branch point in the flow of control. If the user does not approve the associations of policy groups with network elements, control passes back to step 240 to change the subset of network elements selected for the role. If the user does approve the associations of policy groups with network elements, control passes to step 280. In completely automated embodiments, step 278 may be omitted and control flows directly to step 280.

Steps 280, 230 represent a loop through all the roles for the particular real-time application. For example, steps 280, 230 represent a loop through all nine roles listed in Table 1 for IP Telephony. In step 280 it is determined whether the last of the roles has been processed through steps 240, 250, 260, 270, 278. If not, control returns to step 230 to determine the next role not already processed. If the last of the roles has been processed, control passes to step 290.

In step 290, optionally, commands from the policy groups are issued and sent to network elements that are members of the policy group to configure them for the real-time applications based on CLI command translations of QoS tools based on the policy group associated with each network element. In some embodiments, the network administrator is prompted to approve issuing the commands. Alternatively, the configuration set derived using the foregoing process is stored and then deployed in a separate operation at another time.

In some embodiments, data indicating progress toward the configuration of the network are stored after any step, for retrieval and reuse at a later time. The data stored at any step includes data indicating the network domain that is configured, the network elements selected for use with the real-time application, the network elements selected for each role, and the policy groups associated with each network element.

Using these techniques, the process of configuring network elements with QoS for voice or other real-time applications is easier, such that the user does not need to do all the work in defining all the network elements to configure for real-time applications, to know what policy to implement at each network element, to know what QoS tools to use to establish each policy at each network element, and to translate each QoS tools into CLI commands.

3.2 Using Meta-Templates

Figure 2B:
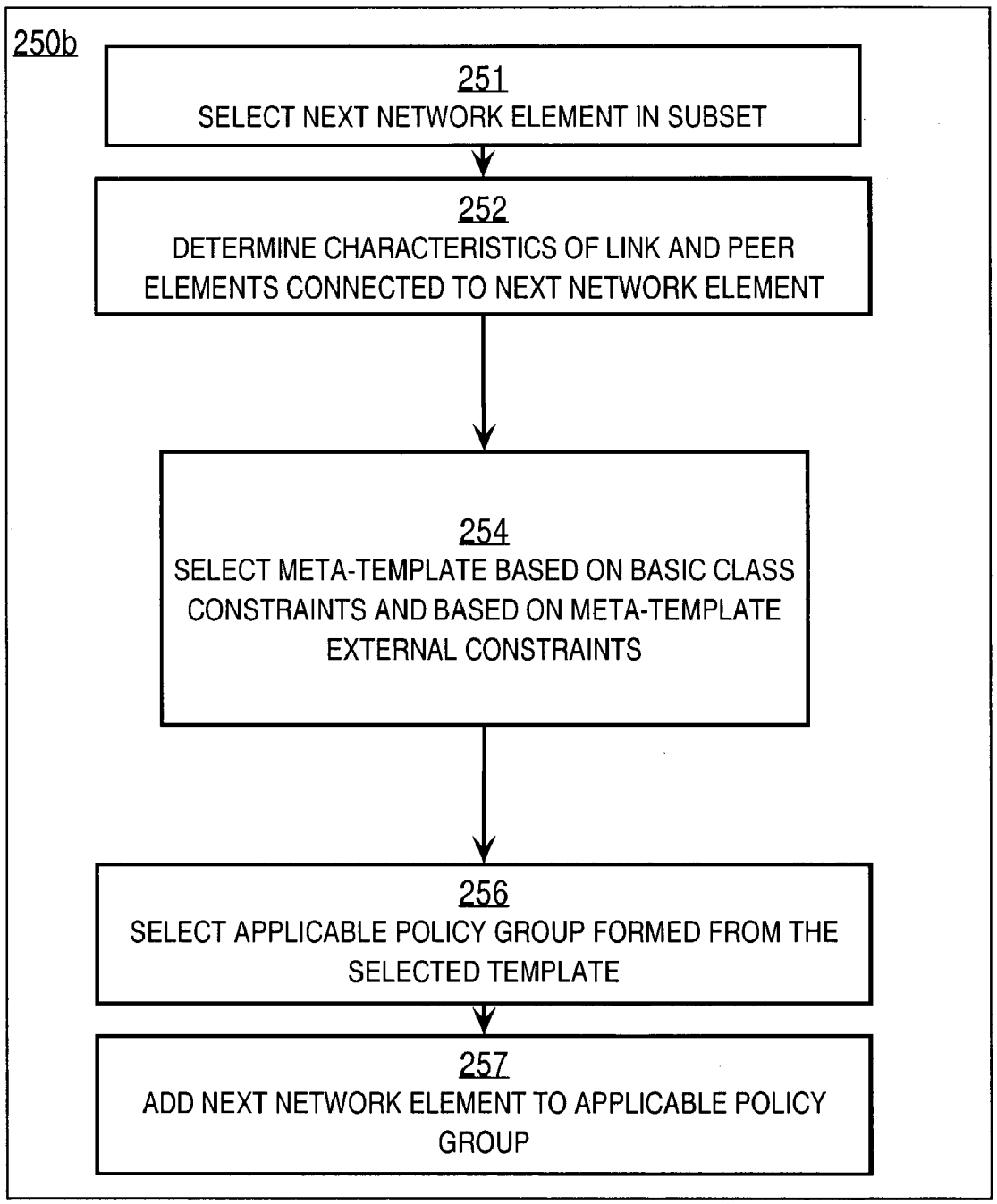
FIG. 2B is a flow diagram that illustrates details of an embodiment of a step depicted in FIG. 2A.

FIG. 2B is a flow diagram that illustrates details of an embodiment 250B of step 250 depicted in FIG. 2A, which uses meta-templates. Although FIG. 2B presents steps in one example order, that order is not critical; for example, alternatively, policy group template constraints may be checked first, before checking meta-template extra constraints.

In step 251, the next element in the subset is selected. In embodiments without roles, the next element in the set of network elements that make up the network domain is selected. For purposes of illustration, it is assumed that the next network element is switch 120a interface connected router 162a.

In step 252, the external characteristics of the network in the vicinity of the next element are determined. For example, the characteristics of the link and one or more peer devices connected to the next network element are determined. For purposes of illustration it is assumed that the data rate of the link connecting the interface of switch 120a to router 162a is 10 megabits per second; and that during step 252 it is determined that the link connected to this interface of switch 120a has a data rate of 10 Mbps. In some embodiments, the model number and operating system version number of the peer device, e.g., router 162a, are also determined during step 252.

In step 254, a meta-template is selected based on the basic class constraints and based on the meta-template external constraints. For example, a meta-template is selected that includes external information that includes links with data rates of 10 Mbps (Ethernet). Selection of links with rates of 100 Mbps (Fast Ethernet) could also be performed. For purposes of illustration, it is assumed that external constraints 152a of meta-template 150a includes a constraint that a data rate of a link connected to the next network element be equal to or greater than 10 Mbps. Therefore meta-template 150a is selected in step 254.

The templates associated with the selected meta-template 150 are determined from the list of templates 154 in the selected meta-template 150. For example, the templates associated with meta-template 150a are determined from the list 154a of templates associated with external constraints in template 150a. For purposes of illustration, it is assumed that the list 154a of associated templates includes template 130b among other templates, but does not include template 130a.

The selected associated template has a class that includes the next network element. For purposes of illustration, it is assumed that both templates 130a and 130b include class constraints 132a, 132b, respectively that include the interfaces of switch 120a. It is further assumed, for purposes of illustration, that policy template 130a applies to switch interfaces connected to routers over links with data rates less than 10 Mbps, and that policy template 130b applies to switch interfaces connected to routers with data rates of 10 Mbps or greater. However, only template 130b is associated with meta-template 150a; therefore, only template 130b is selected in step 255. Thus, the meta-templates help distinguish between two or more policy templates that apply to the same class of network elements in the same role.

In step 256, the applicable policy group is selected that was formed from the selected template. This step includes creating the policy group based on the selected template, where the next element is to be the first member of the policy group. This step also includes selecting a policy group previously created from the selected template, where the next element is to be added to the list of members of the policy group. For example, policy group 140a, which was created based on template 130b, is selected as the applicable policy group during step 256.

In the illustrated embodiment, step 250b includes step 257. In step 257, the next element is added to the list of members of the applicable policy group. For example, the interface of switch 120a connected to router 162a is added to the list 146a of network element members of policy group 140a. In other embodiments, the next element is not added to the list 146 of members until step 278, when the association is approved by a network administrator.

4.0 EXAMPLE OF CONFIGURING NETWORK ELEMENTS FOR IP TELEPHONY

For purposes of illustration, assume the following. Enterprise network 100 is to be configured to support IP telephony between IP phones connected to LANs 110a, 110b. LANs 110a, 110b are connected to more IP phones than the IP phones 108a, 108b illustrated in FIG. 1A, and LANs 110a, 110b are also connected to several personal computers (PCs), not shown, executing software to serve as soft phones. Network management system 168 includes a wizard to perform the steps of method 200, and a network administrator is operating the network management system 168.

The network administrator is presented with a window on a display device. The window includes tabs that the administrator can select to perform various network management functions, such as a "Devices" tab for defining the devices on the network and a "Configure" tab for configuring devices on the network. The administrator selects the Configure tab and is presented with multiple sub-tabs including a "Deployment Groups" sub-tab, a "Policy Groups" sub-tab and an "IP Telephony" sub-tab. The administrator defines one or more network domains under the Deployment Groups sub-tab according to any method known when the system is built.

4.1 Example Policy Groups

The administrator defines policy groups for classes of network elements for each of the roles listed above in Table 1 under the Policy Groups sub-tab according to methods described in Koren. At any time, an authorized network administrator may modify an existing group policy to generate a new group policy.

Assume that the administrator has defined the policy groups listed in Table 2, among others. Also assume that the policy groups listed in Table 2 are for the fast data rate links, at 1 Mbps or above, while other policy groups with similar names (not shown) are for the slower data rate links, less than 1 Mbps. In the Table 2, PFC, CoS, DSCP and TX are abbreviations. In some devices available from Cisco Systems, some QoS actions are performed centrally on an Application Specific Integrated Circuit (ASIC)-based card called the Policy Feature Card (PFC). CoS means Class of Service, which is one system for indicating priorities that influence QoS treatment. DSCP refers to Differential Services Code Point, another system for indicating priorities that influence QoS treatment. TX refers to 100base-TX, which is a fast Ethernet port; a TX queue is a transmission queue of a switch in which all packets are placed after all quality of service processing is complete and immediately before transmission into the network. There may be more than one TX queue having different priority values associated with them. Scheduling a TX queue refers to mapping CoS values to queue and threshold values. IOS refers to the Internetworking Operating System available from Cisco Systems, Inc.

TABLE 2

Example policy groups in IP Telephony.

| Policy Group number | Policy Group Name | Policy Group Description |
|---|---|---|
| 1 | Acc3550toIPPhone | Contains policies used for a Catalyst 3550 family switch port that is connected to an IP-Phone. |
| 2 | Acc6000toIPPhone | Contains policies used for a Catalyst 6000 (with PFC) family switch port that is connected to an IP-Phone. |
| 3 | VoiceDeviceCat3550 | Contains policies used for Catalyst 3550 devices that take part in the AVVID network and sets CoS to DSCP mappings. |
| 4 | VoiceDeviceCat4000 | Contains policies used for Catalyst 4000 devices that take part in the AVVID network and sets scheduling on the TX queue. |
| 5 | VoiceDeviceCat6000 | Contains policies used for Catalyst 6000 devices that take part in the AVVID network and sets scheduling on the TX queue and sets CoS to DSCP mappings. |
| 6 | VoiceDeviceCat6000IOS | Contains policies used for Catalyst 6000-IOS devices that take part in the AVVID network and sets CoS to DSCP mappings. Schedule settings are done on the ports. |

Assume that one or more network administrators have defined the policy group Acc6000 toIPPhone as follows. The Acc6000toIPPhone policy group is applicable to a class of network elements as listed in Table 3 and includes QoS policies as listed in Table 4. The attributes that define the class of network elements are herein called class constraints for the policy group.

TABLE 3

Example class constraints on class of network elements for Acc6000toIPPhone policy group.

| Constraint Number | Device Model | Operating System Version | Compatible IOSs | Interface type | Network element |
|---|---|---|---|---|---|
| 1 | Cat6000_PFC2 | 6.2 | 6.1, 6.2, 6.3, 7.1 | Ethernet | Interface |
| 2 | Cat6000_PFC1 | 6.2 | 6.1, 6.2, 6.3, 7.1 | Ethernet | Interface |
| 3 | Cat6000_PFC2 | 6.1 | 6.1, 6.2, 6.3, 7.1 | Ethernet | Interface |
| 4 | Cat6000_PFC1 | 6.1 | 6.1, 6.2, 6.3, 7.1 | Ethernet | Interface |
| 5 | Cat6000_PFC2 | 6.3 | 6.1, 6.2, 6.3, 7.1 | Ethernet | Interface |
| 6 | Cat6000_PFC1 | 5.5 | 5.5, 6.1, 6.2, 6.3, 7.1 | Ethernet | Interface |
| 7 | Cat6000_PFC2 | 7.1 | 6.1, 6.2, 6.3, 7.1 | Ethernet | Interface |
| 8 | Cat6000_PFC1 | 6.3 | 6.1, 6.2, 6.3, 7.1 | Ethernet | Interface |
| 9 | Cat6000_PFC1 | 7.1 | 6.1, 6.2, 6.3, 7.1 | Ethernet | Interface |

This embodiment assumes that the IP phones are Cisco IP phones that color all their voice traffic with CoS=5. CoS=5 is mapped to DSCP=46 according to a CoS to DSCP mapping table maintained by the network management system. This example also assumes that the PCs connected to the access ports of the IP phones, such as PC 106a, 106b, are not allowed to classify their own traffic. Thus the IP phones re-classify all traffic from the PCs with CoS=0. This example further assumes that a voice VLAN for the voice traffic has been defined.

The QoS policies of this policy group extend the trust boundary of the Ethernet switch to the IP phone but not beyond the phone to the PC. "Trust State :trust-cos" sets the switch port to trust the CoS value from the IP phone and translate it into a value for the DSCP field according to the CoS to DSCP mapping table. "Trust Ext :untrusted" sets the switch port to not change the trust boundary from the IP phone. "QoS Style vlan-based" indicates that trust and color are applied only to traffic on the voice VLAN. Inline Power refers to a feature that enables power to come from the switch port to the IP phone rather than from an external power supply. Some switches have the ability to supply the electric power needed by the IP phone through the network cable. This capability has to be turned on when connecting a phone to the network, as the phone will have no power supply without it. On the other hand, connecting a different device to a port with inline power might disrupt the device operation, as it does not expect to receive electric power through the network line.

TABLE 4

Example QoS policies in the Acc6000toIPPhone policy group.

| Property Number | Property name | Property value |
|---|---|---|
| 1 | Inline Power | Enabled |
| 2 | QoS Style | vlan-based |
| 3 | Trust State | trust-cos |
| 4 | Trust Ext | untrusted |

In the example embodiment, the policy template and derived policy group store these QoS policies in an abstract form, and the policies are translated into CLI commands to issue to network elements at the time of deployment. For example, the above policies are translated into CLI commands by substituting a particular list of ports for the parameter <ip-phone-port(s)> in the following data stored in the policies of the policy group:

set port qos <ip-phone-port(s)> trust-ext untrusted
    set port qos <ip-phone-port(s)> trust trust-cos
    set port qos <ip-phone-port(s)> vlan-based 4.2 Example Distribution of Policy Groups When the administrator selects the IP Telephony sub-tab, step 210 of FIG. 2A is performed, with IP telephony as the real-time application. Any user authentication and authorization needed and not already performed to operate the network management system is performed during this step.

Figure 3A:
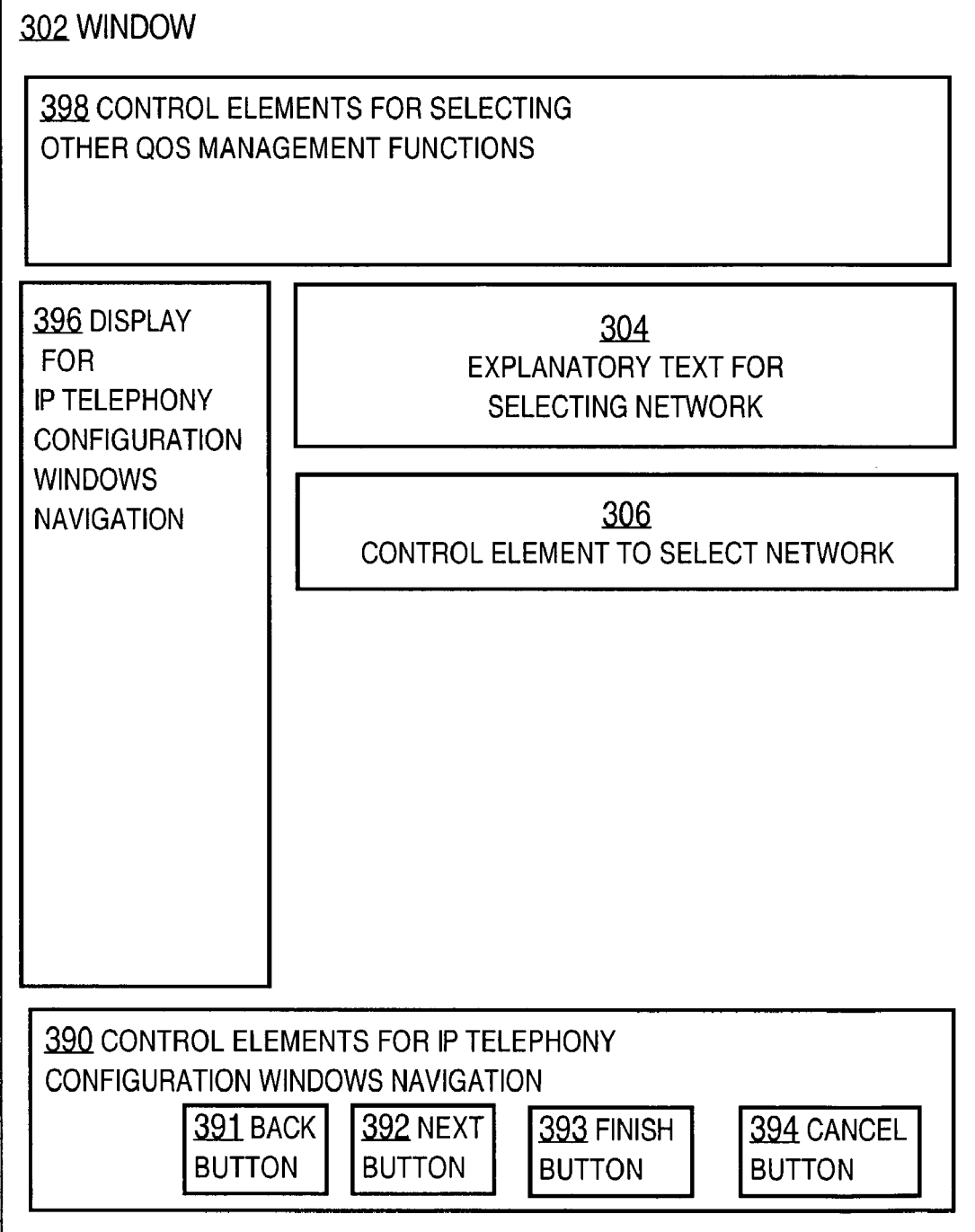
FIG. 3A is a block diagram of a window of a user interface for configuring network elements to support IP telephony by selecting a network, according to an embodiment.

In step 210, the administrator is presented with a window, such as illustrated in FIG. 3A. FIG. 3A is a block diagram of a window 302 of a user interface for configuring network elements to support IP telephony by selecting a network domain, according to an embodiment. Window 302 includes portions 390, 396, 398 that appear in multiple windows for configuring IP telephony, and portions 304, 306 that are unique to window 302 for selecting the network domain to configure for IP telephony.

Window portion 398 includes control elements for selecting other management functions, including other QoS management functions. In an example embodiment, window portion 398 includes the tab for "Devices" as well as the currently selected "Configure" tab. In this embodiment, window portion 398 also includes a "Deploy" tab for deploying the configurations established in the current wizard, and also includes other tabs, such as a "Reports" tab for generating reports of network layout and status, and an "Admin" tab for performing administration functions such as registering authorized users.

In the example embodiment, the window portion 398 includes the sub-tabs for the currently selected Configure tab. The sub-tabs include the Deployment Groups sub-tab, the Policy Groups sub-tab and the currently selected IP Telephony sub-tab, among other tabs.

Window portion 396 includes a display for indicating the user's location among the windows of the IP Telephony sub-tab. In window 302, the contents of the window portion 396 includes a listing of the window names for windows used to navigate the configuration of IP Telephony at the next lowest level, including an Introduction window, a Select Devices window, nine role windows, and an End window. In window 302, the contents of the window portion 396 highlight the "Introduction" list entry, indicating the current window 302 is the Introduction Window.

Window portion 390 includes control elements for navigating between windows of the IP Telephony sub-tab, as displayed in window portion 396. In the example of FIG. 3A, window portion 390 includes a "Back" button 391, a "Next" button 392, a "Finish" button 393, and a "Cancel" button 394. These buttons are display areas that cause the wizard to perform a function when a pointing device is used to place a cursor over the button and an actuator on the pointing device is activated, such as by a user clicking on a particular button on the pointing device. When the Back button 391 is activated, the wizard presents the window shown in portion 396 to precede the current window. When the Next button 392 is activated, the wizard accepts all the inputs made on the current window, if any, saves them to storage, and presents the window shown in portion 396 to follow the current window. When the Finish button 393 is activated, the wizard accepts all the inputs made on the current window, if any, and stores the state of the configuration for the network determined to this point, and presents the End window included in portion 396 at the bottom of the list. When the Cancel button 392 is activated, the wizard refuses all the inputs made on the current window, if any, exits and presents the policy group display in the General tab.

Window portion 304 includes explanatory text for selecting a network domain (also called a "device group") on which elements are to be configured for IP Telephony. For example, the window portion 304 includes statements such as the following "This IP Telephony Wizard is designed to help you to configure end-to-end QoS for voice traffic in enterprise networks, throughout campus domains, branch offices and WAN implementations;" and "You can use any deployment group to configure IP telephony QoS. Select the desired deployment group from the list box, if it is not already displayed."

In this context, for each device group, there may be several "deployment groups". A deployment group is a set of policy groups to be deployed concurrently to implement a complete and consistent configuration of all the devices in the device group. The user may define several alternative and mutually exclusive deployment groups for a single device group.

Window portion 306 includes one or more control elements for selecting the network domain. In the example embodiment, the control element is a list box including a downward arrow that can be activated by a user to show the choices from which the user can select. In the example embodiment, the list box includes a "Default Deployment Group" that includes policies that are defined per device group.

When the network administrator is finished selecting the network domain to configure for IP Telephony, the network administrator activates the Next button 392. Control then passes to step 212 of FIG. 2A, to select network elements to use with the real time application.

Figure 3B:
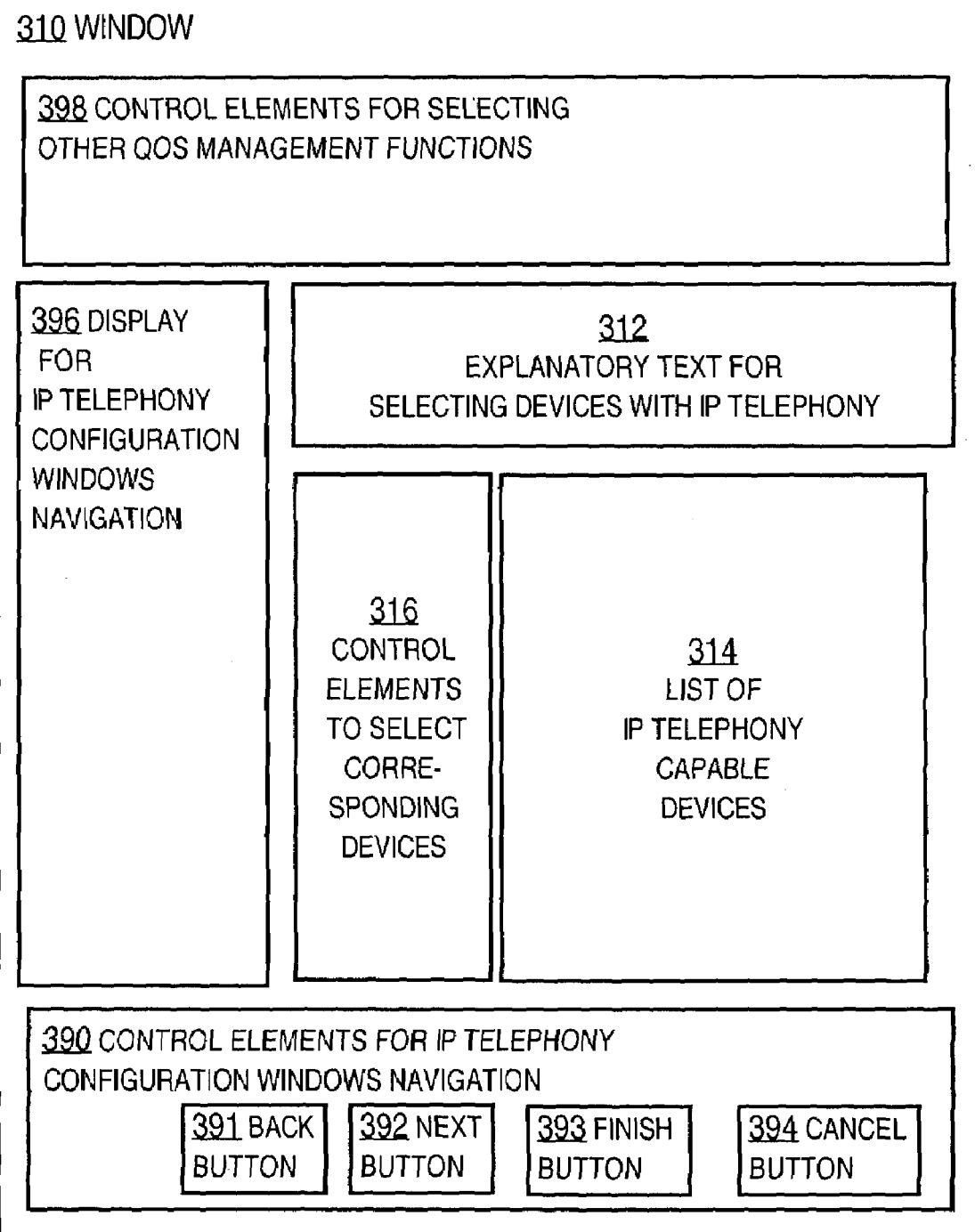
FIG. 3B is a block diagram of a window of a user interface for configuring network elements to support IP telephony by selecting devices, according to an embodiment.

In step 212, the administrator is presented with a window, such as illustrated in FIG. 3B. FIG. 3B is a block diagram of a window 310 of a user interface for configuring network elements to support IP telephony by selecting devices.

Window 310 includes portions 390, 396, 398 that appear in multiple windows for configuring IP telephony, and portions 312, 314, 316 that are unique to window 310 for selecting network devices in the network domain to configure for IP telephony. The contents of window portion 396 for Window 310 highlight the "Select Devices" list entry, indicating the current window 310 is the Select Devices Window. In the example embodiment, the contents of window portion 396 also show subheadings for the current window that include "Select" and "Configuration Info."

Window portion 312 includes explanatory text for selecting devices within the selected network domain. In the example embodiment, the window portion 312 includes the following statement: "The wizard has discovered the following devices that support IP telephony and might require QoS configuration. . . . Select the devices that you want to participate in the current IP Telephony wizard session. The wizard will configure only the network elements and devices from the selected devices."

Window portion 314 includes a list of the devices in the selected network domain. For example, the list includes the device name in the network management system, the device's network address, the device model name or number, and the operating system for the device. Assume, for example, that Switch 112*a* is a cat6000 device which is listed with system name "cd-dc6supt-3," network address "10.51.116.183," model "cat6000," and operating system "6.3."

Window portion 316 includes control elements for selecting or deselecting list entries in the list displayed in window portion 314. In the example embodiment, window portion 316 includes a checkbox for each device listed in window portion 314. A user changes the state of a checkbox from checked to unchecked, or vice versa, by positioning a cursor over the checkbox with the pointing device and activating the pointing device's actuator. In the example embodiment, every device listed is initially checked for inclusion in IP telephony. The network administrator may participate in step 220 by removing or adding devices using the checkboxes.

When the network administrator is finished deselecting the devices to configure for IP Telephony, the network administrator activates the Next button 392. The wizard then completes step 220 by selecting the devices still checked. Control then passes to step 230 of FIG. 2A, to determine the next role associated with IP Telephony.

Step 230 determines that the next role is the role associated with the next window listed in the window portion 396. After the administrator activates the Next button from window 310, the next role is the IP Phone role, described above. Control then passes to step 240 to select a subset of network elements associated with the role.

In step 240, the administrator is presented with a window, such as illustrated in FIG. 3C. FIG. 3C is a block diagram of a window 320 of a user interface for configuring network elements to support IP telephony by selecting elements that perform a particular role, according to an embodiment.

Window 320 includes portions 390, 396, 398 that appear in multiple windows for configuring IP telephony, and portions 322, 324, 326 that are unique to window 320 for selecting network elements to configure for the IP Phone role. The contents of window portion 396 for Window 310 highlight the "IP Phone" list entry, indicating the current window 320 is the IP Phone Window. In the example embodiment, the contents of window portion 396 also show subheadings for the current window that include "Select" and "Configuration Info."

Window portion 322 includes explanatory material for selecting network elements that perform the role. In the example embodiment, the window portion 322 includes a diagram of a PC and IP Phone connected to a switch and the following statements: "Select IP Phone Connections;" and "Select the switch ports on which the wizard will configure the QoS settings for the IP phone connections." In some embodiments, other statements describing the QoS policies for the IP Phone role are displayed in the window portion 322. Also, window portion 322 may include a control element for hiding or showing one or more of these statements Window portion 324 includes a list of the interfaces on the devices selected in step 220 that can serve in the IP Phone role. In the example embodiment, the list includes the interface name, the interface type, the bandwidth (also called "rate") and the system name of the device on which the interface resides. For purposes of illustration, assume that Ethernet interfaces on multiple switches in LANs 110a, 110b are included in the list.

Window portion 326 includes control elements for selecting or deselecting list entries in the list displayed in window portion 324. In the example embodiment, window portion 316 includes a checkbox for each item listed in window portion 314. In the example embodiment, certain interfaces are initially checked ("pre-selected") for performing the IP Phone role.

Any rules for automatically pre-selecting network elements may be used. It is anticipated that, in may embodiments, network administrators experienced in IP Telephony applications form the automatic pre-selection rules. The rules may depend at least in part on the connections between network elements, as well as on properties of network elements. For example, the pre-selection rules listed in Table 5 are used for the IP Phone role.

TABLE 5

Example pre-selection rules for the IP Phone role.

| Rule Number | Rule Type | Rule description |
|---|---|---|
| 1 | Exclusion | Exclude if interface has neighbor and neighbor is not an IP phone. |
| 2 | Inclusion | Include if interface has neighbor and neighbor is an IP phone. |
| 3 | Inclusion | Include if interface has no neighbor but device has a device role, and device role is Campus-Access and device has an auxiliary VLAN assignment. |
| 4 | Inclusion | Include if interface has no neighbor but device has a device role, and device role is Campus-Access and interface is on a power module. |
| 5 | Inclusion | Include if interface has no neighbor and device has no device role, and device has an auxiliary VLAN assignment. |
| 6 | Inclusion | Include if interface has no neighbor and device has no device role, and interface is on a power module. |

In some embodiments, the pre-selection rules are displayed in the window portion 322. In some embodiments, window portion 322 includes a control element for hiding or showing the pre-selection rules. In the illustrated embodiment depicted in FIG. 1A, the interface on switch 112a linked to IP Phone 108a and the interface on switch 112b linked to IP Phone 108b are pre-selected; but the interface on switch 120a linked to router 162a and the interface on switch 120b linked to router 162b are not pre-selected. When hundreds or thousands of network elements are involved in the selected devices, automatic pre-selection frees the system administrator from much tedious effort.

The network administrator is than allowed to change the selections of network elements to perform the IP Phone role. For example, the network administrator may anticipate not using, for IP Telephony, some of the switch interfaces without neighbors that were pre-selected by the wizard; and the network administrator deselects those interfaces. When the network administrator is finished selecting and deselecting the interfaces to perform the IP Phone role, the network administrator activates the Next button 392. Assume for the present that the network administrator does not change the pre-selected interfaces. Control then passes to the loop represented by steps 250, 260 of FIG. 2A, to associate a policy group with each network element selected to perform the IP Phone role.

In step 250 the wizard checks each network element selected as a result of step 240 against the constraints for the class of network elements for each policy group associated with the role and any meta-templates. In the example embodiment, the policy groups and the external characteristics match the external constraints in the meta-templates that contain these policy groups. The network element is associated with the policy group if the network element satisfies the constraints for the policy group and the external characteristics match the external constraints in the meta-templates. This association is performed behind the scenes, unobserved by the user of the wizard. Assume, for purposes of illustration, that the Switch 113 is a Cat6000 family device with a PFC. Because Switch 112a is a Cat6000 family device with operating system 6.3, as noted above, it satisfies either constraint 5 or constraint 8 listed in Table 3, above. Therefore Switch 112a is associated with policy group Acc6000toIPPhone during the loop through steps 250, 260. Assume, for purposes of illustration, that Switch 112*b* is a Cat3550 family device that satisfies at least one of the constraints of policy group Acc3550toIPPhone. Therefore, Switch 112*b* is associated with policy group Acc3550toIPPhone during the loop through steps 250, 260.

Control then passes to step 270 to present the policy groups and associated network elements for approval.

In step 270, the administrator is presented with a window, such as illustrated in FIG. 3D. FIG. 3D is a block diagram of a window 330 of a user interface for configuring network elements to support IP telephony by presenting elements associated with each policy group for a particular role.

Window 330 includes portions 390, 396, 398 that appear in multiple windows for configuring IP telephony, and portions 332, 334 that are unique to window 330 for approving policy groups associated with network elements. The contents of window portion 396 for Window 330 highlight the "IP Phone" and "Configuration Info." list entries, indicating the current window 330 is an IP Phone Window that presents configuration information.

Window portion 332 includes explanatory text for approving policy groups associated with network elements within the highlighted role. In the example embodiment, the window portion 332 includes the following statements: "The wizard has completed the assignment of the selected network elements to the appropriate voice policy groups with a 'IP Phone' voice role;" "Total number of selected network elements assigned: X1;" "Previously assigned to this role: X2;" "Newly assigned to this role: X3;" "Selected but not assigned: X4;" "The following table displays all the voice policy groups that have a 'IP Phone' voice role. You can view the properties and policies that are configured for a voice policy group by clicking its name in the table. You can also view a list of the network elements that were newly assigned to a voice policy group by clicking its link in the table;" and "When you have finished reviewing your selection, click Next to save it, or Back to return to the previous page to change your selection." Here "X1," "X2," "X3," "X4" are symbols for some numbers. In some embodiments, window portion 332 includes one or more control elements so that a user can obtain more information about one or more of these statements.

Window portion 334 includes a list of the policy groups and the number of network elements associated with the policy group. In the example embodiment, the list includes the policy group name, the description of the policy group, and the number of network elements newly assigned to the policy group. By clicking on the number of network elements, a list of the network elements is presented. For example, by clicking on the number of elements assigned to policy group Acc6000toIPPhone, a list is presented that includes the interface of Switch 112*a* linked to IP Phone 108*a*.

When the network administrator approves the assignment of network elements to policy groups, the network administrator activates the Next button 392. Control then passes to step 230 of FIG. 2A, to determine the next role associated with IP Telephony. Steps 230 through 278 are repeated for each role, presenting the user with windows 320, 330 for each role.

When the last role is completed, control passes to step 290. In step 290, the network administrator reaches the End window for IP Telephony. In the End window, the user is presented with instructions on how to deploy the assigned policy groups to the associated network elements to configure them for end-to-end IP Telephony. For example, the user is prompted to name and store data indicating the network elements and assignments; and the user is instructed to activate the Deploy tab when the network elements are to be reconfigured.

As described above, techniques of the present invention enable new and expert users of packet telephony to configure the QoS in their network almost immediately using pre-defined policy groups, without delving into arcane details underlying QoS techniques and implementations. The techniques allow for different policy groups to be assigned to elements of the same class playing the same role on the basis of characteristics of the network external to the network element playing the role.

5.0 IMPLEMENTATION MECHANISMS

Hardware Overview

In one embodiment, the foregoing processes are implemented using a distributed, Web-based architecture. Computational steps may be performed one computer, but the user interface is seen and operated through a browser, which may be run over a different computer. Furthermore, various components of the computational apparatus (e.g., logical processing and database) may reside on separate computers and communicate using a LAN connection.

Figure 4:
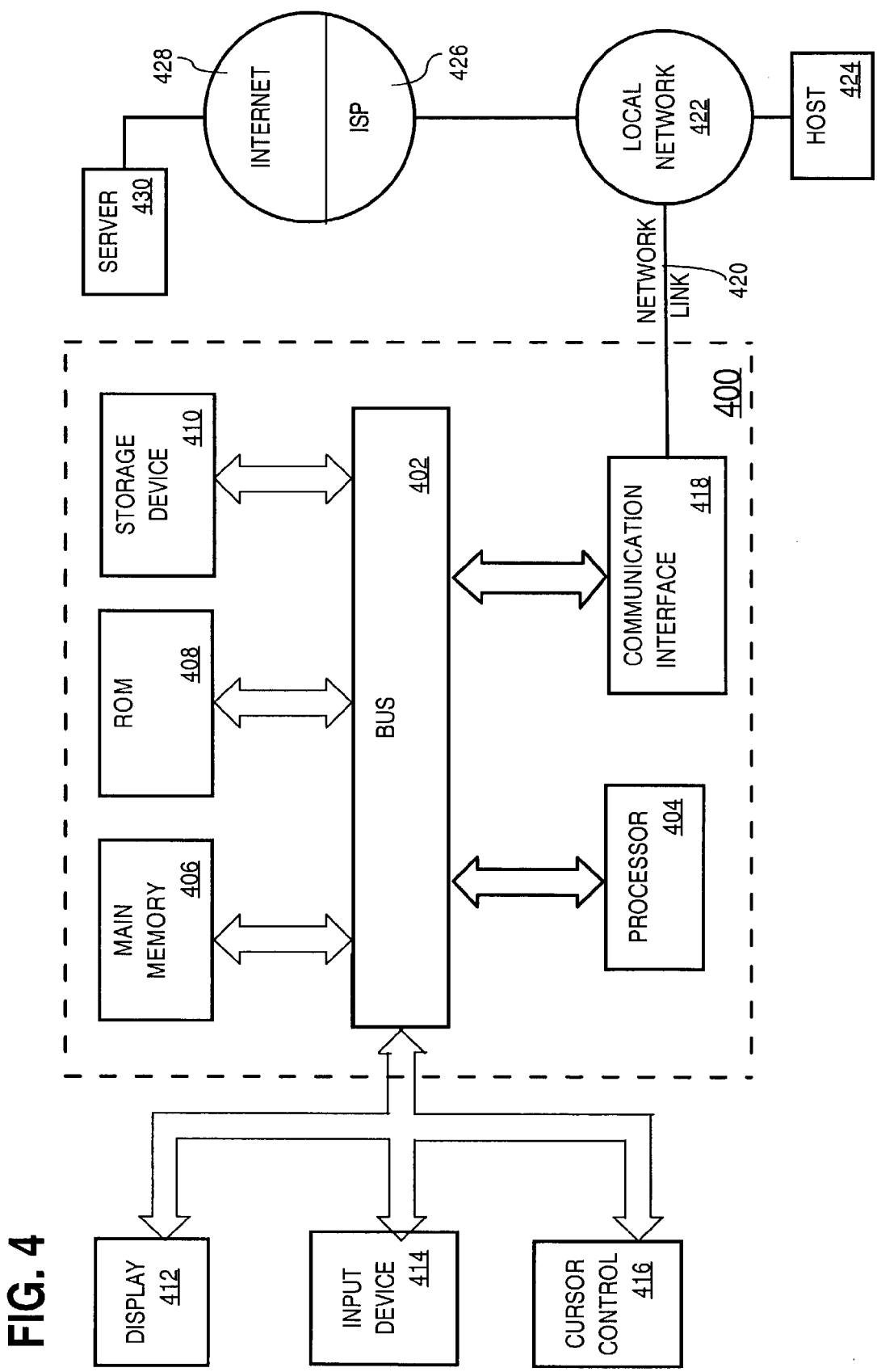
FIG. 4 is a block diagram that illustrates a computer system upon which an embodiment may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory ("RAM") or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory ("ROM") 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube ("CRT"), for displaying information to a computer user. An input device 414, including alphanumeric and other keys, is coupled to bus 402 for communicating information and command selections to processor 404. Another type of user input device is cursor control 416, such as a mouse, trackball, stylus, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for configuring network elements to support real-time applications. According to one embodiment of the invention, configuring network elements to support real-time applications is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network ("ISDN") card or a modem to provide a data communication connection to a corresponding type of telephone line. As another example, communication interface 418 may be a local area network ("LAN") card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider ("ISP") 426. ISP 426 in turn provides data communication services through the worldwide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for configuring network elements as described herein.

The received code may be executed by processor 404 as it is received, and/or stored in storage device 410, or other non-volatile storage for later execution. In this manner, computer system 400 may obtain application code.

6.0 EXTENSIONS AND ALTERNATIVES

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of configuring a plurality of network elements linked together by a plurality of links to support real-time applications, the method comprising the computer-implemented steps of:
   maintaining a plurality of Quality of Service (QoS) policy templates, wherein
       maintaining each QoS policy template further comprises associating a class of network elements with a QoS action to perform on a network data packet by a network element that belongs to the class, and
       the class of network elements is defined by a first constraint set on one or more first properties of the network elements belonging to the class;
   maintaining a meta-template, comprising associating external information with an associated template of the plurality of QoS policy templates, wherein the external information indicates a second constraint set which contains data that is not intrinsic to any network element on one or more second properties different from the one or more first properties; and
   automatically configuring the plurality of network elements based at least in part on the meta-template.

2. A method as recited in claim 1, wherein the second constraint set includes a constraint on a data rate of the link connected to the network element.

3. A method as recited in claim 1, wherein the second constraint set includes a constraint on a different network element connected by the link to the network element.

4. A method as recited in claim 1, said step of automatically configuring the plurality of network elements further comprising:
   selecting from the plurality of network elements a particular network element connected to a particular link;
   selecting a particular meta-template for the particular network element based on the particular link and the external information of the particular meta-template;
   selecting a particular template based on the particular network element and the particular meta-template; and
   configuring the particular network element based on the particular template.

5. A method as recited in claim 4, said step of selecting the particular meta-template further comprising selecting the particular meta-template based on the one or more second properties related to the particular link satisfying the second constraint set in the external information of the particular meta-template.

6. A method as recited in claim 4, said step of selecting the particular template further comprising selecting the particular template that is associated with the external information in the particular meta-template and that defines a particular class of network elements that includes the particular network element.

7. A method as recited in claim 4, said step of configuring the particular network element based on the particular template further comprising:
   adding the particular network element to a particular policy group that configures network elements in the particular class to perform a particular action associated with the particular class in the particular template; and
   configuring the particular network element based on the particular policy group.

8. A method as recited in claim 4, said step of selecting from the plurality of network elements a particular network element further comprising:
   determining a first role of a plurality of roles performed by one or more network elements to completely support a particular real-time application;
   selecting from the plurality of network elements a first subset of one or more network elements that will perform the first role based at least in part on the plurality of links; and
   selecting the particular network element from the first subset.

9. A method as recited in claim 8, said step of selecting a particular meta-template further comprising selecting the particular meta-template from a set of one or more meta-templates associated with the first role.

10. A method of configuring a plurality of network elements linked together by a plurality of links to support real-time applications, the method comprising the computer-implemented steps of:
   selecting from the plurality of network elements a particular network element connected to a particular link;
   selecting a particular meta-template for the particular network element based on the particular link and external information included in the particular meta-template;
   selecting a particular template from a plurality of templates based on the particular network element and the particular meta-template; and
   automatically configuring the particular network element based on the particular template,
   wherein
      each template of the plurality of templates associates a class of network elements with an action to perform on a network data packet by a network element that belongs to the class,
      the class of network elements is defined by a first constraint set on one or more first properties of the network elements;
      the meta-template associates the external information with an associated template of the plurality of templates, and
      the external information indicates a second constraint set on one or more second properties different from the one or more first properties.

11. A computer-readable storage medium carrying one or more sequences of instructions for configuring a plurality of network elements linked together by a plurality of links to support real-time applications, which instructions, when executed by one or more processors, cause the one or more processors to carry out the steps of:
   maintaining a plurality of Quality of Service (QoS) policy templates, wherein
      maintaining each QoS policy template further comprises associating a class of network elements with a QoS action to perform on a network data packet by a network element that belongs to the class, and
      the class of network elements is defined by a first constraint set on one or more first properties of the network elements belonging to the class;
   maintaining a meta-template, comprising associating external information with an associated template of the plurality of QoS policy templates, wherein the external information indicates a second constraint set which contains data that is not intrinsic to any network element on one or more second properties different from the one or more first properties; and
   automatically configuring the plurality of network elements based at least in part on the meta-template.

12. A computer-readable storage medium carrying one or more sequences of instructions for configuring a plurality of network elements linked together by a plurality of links to support real-time applications, which instructions, when executed by one or more processors, cause the one or more processors to carry out the steps of:
   selecting from the plurality of network elements a particular network element connected to a particular link;
   selecting a particular meta-template for the particular network element based on the particular link and external information included in the particular meta-template;
   selecting a particular template from a plurality of templates based on the particular network element and the particular meta-template; and
   automatically configuring the particular network element based on the particular template,
   wherein
      each template of the plurality of templates associates a class of network elements with an action to perform on a network data packet by a network element that belongs to the class,
      the class of network elements is defined by a first constraint set on one or more first properties of the network elements;
      the meta-template associates the external information with an associated template of the plurality of templates, and
      the external information indicates a second constraint set on one or more second properties different from the one or more first properties.

13. An apparatus for configuring a plurality of network elements linked together by a plurality of links to support real-time applications, comprising:
   means for maintaining a plurality of Quality of Service (QoS) policy templates, wherein
      maintaining each QoS policy template further comprises associating a class of network elements with a QoS action to perform on a network data packet by a network element that belongs to the class, and
      the class of network elements is defined by a first constraint set on one or more first properties of the network elements belonging to the class;
   means for maintaining a meta-template, comprising associating external information with an associated template of the plurality of QoS policy templates, wherein the external information indicates a second constraint set which contains data that is not intrinsic to any network element on one or more second properties different from the one or more first properties; and means for automatically configuring the plurality of network elements based at least in part on the meta-template.

14. An apparatus for configuring a plurality of network elements linked together by a plurality of links to support real-time applications, comprising:

means for selecting from the plurality of network elements a particular network element connected to a particular link;

means for selecting a particular meta-template for the particular network element based on the particular link and external information included in the particular meta-template;

means for selecting a particular template from a plurality of templates based on the particular network element and the particular meta-template; and means for automatically configuring the particular network element based on the particular template, wherein each template of the plurality of templates associates a class of network elements with an action to perform on a network data packet by a network element that belongs to the class, the class of network elements is defined by a first constraint set on one or more first properties of the network elements;

the meta-template associates the external information with an associated template of the plurality of templates, and the external information indicates a second constraint set on one or more second properties different from the one or more first properties.

15. An apparatus for configuring a plurality of network elements linked together by a plurality of links to support real-time applications, comprising:

a network interface that is coupled to the data network for receiving one or more packet flows therefrom;

a processor;

one or more stored sequences of instructions which, when executed by the processor, cause the processor to carry out the steps of:

maintaining a plurality of Quality of Service (QoS) policy templates, wherein maintaining each QoS policy template further comprises associating a class of network elements with a QoS action to perform on a network data packet by a network element that belongs to the class, and the class of network elements is defined by a first constraint set on one or more first properties of the network elements belonging to the class;

maintaining a meta-template, comprising associating external information with an associated template of the plurality of QoS policy templates, wherein the external information indicates a second constraint set which contains data that is not intrinsic to any network element on one or more second properties different from the one or more first properties; and automatically configuring the plurality of network elements based at least in part on the meta-template.

16. An apparatus for configuring a plurality of network elements linked together by a plurality of links to support real-time applications, comprising:

a network interface that is coupled to the data network for receiving one or more packet flows therefrom;

a processor;

one or more stored sequences of instructions which, when executed by the processor, cause the processor to carry out the steps of:

selecting from the plurality of network elements a particular network element connected to a particular link;

selecting a particular meta-template for the particular network element based on the particular link and external information included in the particular meta-template;

selecting a particular template from a plurality of templates based on the particular network element and the particular meta-template; and automatically configuring the particular network element based on the particular template, wherein each template of the plurality of templates associates a class of network elements with an action to perform on a network data packet by a network element that belongs to the class, the class of network elements is defined by a first constraint set on one or more first properties of the network elements;

the meta-template associates the external information with an associated template of the plurality of templates, and the external information indicates a second constraint set on one or more second properties different from the one or more first properties.

* * * * *